(12) United States Patent
Aggarwal et al.

(10) Patent No.: US 11,568,048 B2
(45) Date of Patent: Jan. 31, 2023

(54) FIRMWARE DESCRIPTOR RESILIENCY MECHANISM

(71) Applicant: Intel Corporation, Santa Clara, CA (US)

(72) Inventors: Nivedita Aggarwal, Portland, OR (US); Zhenyu Zhu, Folsom, CA (US); Michael Berger, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 17/131,985

(22) Filed: Dec. 23, 2020

(65) Prior Publication Data
US 2021/0117539 A1    Apr. 22, 2021

(51) Int. Cl.
| | |
|---|---|
| *G06F 21/55* | (2013.01) |
| *G06F 11/14* | (2006.01) |
| *G06F 13/42* | (2006.01) |
| *G06F 21/57* | (2013.01) |
| *H04L 9/32* | (2006.01) |
| *G06F 11/07* | (2006.01) |
| *G06F 11/20* | (2006.01) |
| *H04L 9/08* | (2006.01) |

(52) U.S. Cl.
CPC ........ *G06F 21/554* (2013.01); *G06F 11/1456* (2013.01); *G06F 11/1469* (2013.01); *G06F 13/4282* (2013.01); *G06F 21/572* (2013.01); *H04L 9/3239* (2013.01); *G06F 2201/805* (2013.01); *G06F 2221/033* (2013.01)

(58) Field of Classification Search
CPC ............... G06F 21/554; G06F 11/1456; G06F 11/1469; G06F 13/4282; G06F 21/572; G06F 2201/805; G06F 2221/033; G06F 11/0763; G06F 11/2094; G06F 21/575; H04L 9/3239; H04L 9/0894; H04L 9/3236
See application file for complete search history.

(56) References Cited

U.S. PATENT DOCUMENTS

| | | | |
|---|---|---|---|
| 8,082,231 B1 * | 12/2011 | McDaniel | G06F 11/1453 707/681 |
| 8,510,592 B1 * | 8/2013 | Chan | G06F 11/0745 714/5.1 |
| 10,572,346 B1 * | 2/2020 | Sharma | G06F 3/067 |
| 2005/0283662 A1 * | 12/2005 | Li | G06F 11/1469 714/13 |
| 2007/0101156 A1 * | 5/2007 | Novoa | G06F 21/575 713/190 |

(Continued)

*Primary Examiner* — Darren B Schwartz
(74) *Attorney, Agent, or Firm* — Jaffery Watson Mendonsa & Hamilton LLP

(57) ABSTRACT

An apparatus to facilitate descriptor resiliency in a computer system platform is disclosed. The apparatus comprises a non-volatile memory to store firmware for a computer system platform, wherein the firmware comprises a primary descriptor including access permission details for platform components and a secondary descriptor including a backup copy of the access permission details and a controller, coupled to the first non-volatile memory, including recovery hardware to detect a problem during a platform reset with the primary descriptor, recover the contents of the primary descriptor from the backup copy included in the secondary descriptor and store the contents of the backup copy to primary descriptor.

16 Claims, 8 Drawing Sheets

(56) References Cited

U.S. PATENT DOCUMENTS

| | | | |
|---|---|---|---|
| 2009/0313695 A1* | 12/2009 | Bridges | G06F 21/54 726/21 |
| 2012/0124419 A1* | 5/2012 | Matthew | G06F 11/1415 714/20 |
| 2012/0266000 A1* | 10/2012 | Maheshwari | G06F 21/6218 713/189 |
| 2013/0110778 A1* | 5/2013 | Taylor | G06F 11/1435 707/624 |
| 2014/0281257 A1* | 9/2014 | Hochberg | G06F 3/065 711/135 |
| 2015/0277930 A1* | 10/2015 | Sarangdhar | G06F 21/572 713/2 |
| 2015/0331754 A1* | 11/2015 | Grobelny | G06F 11/1438 714/23 |
| 2016/0063255 A1* | 3/2016 | Jeansonne | G06F 21/575 713/2 |
| 2017/0060781 A1* | 3/2017 | Soja | G06F 12/1466 |
| 2017/0085383 A1* | 3/2017 | Rao | G06F 21/575 |
| 2017/0123890 A1* | 5/2017 | Haridas | G06F 16/2282 |
| 2017/0180137 A1* | 6/2017 | Spanier | H04L 9/3247 |
| 2019/0042766 A1* | 2/2019 | Pappachan | G06F 21/606 |
| 2019/0266331 A1* | 8/2019 | Sanchez Diaz | G06F 21/51 |
| 2020/0201714 A1* | 6/2020 | Montero | G06F 11/1469 |
| 2020/0293671 A1* | 9/2020 | Krause | G06F 11/2089 |
| 2021/0406381 A1* | 12/2021 | Heisrath | H04L 63/108 |

* cited by examiner

FIRMWARE DESCRIPTOR RESILIENCY MECHANISM

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. Additionally, SOCs enable the integration of third party components via a standardized on-die interconnect protocol. However, the addition of such components may lead to security vulnerabilities.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In embodiments, a mechanism is provided to facilitate firmware descriptor resiliency in a computer system platform. In such embodiments, verifier hardware copies the contents of a primary firmware descriptor from a backup descriptor upon determining that the primary firmware descriptor has been corrupted.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
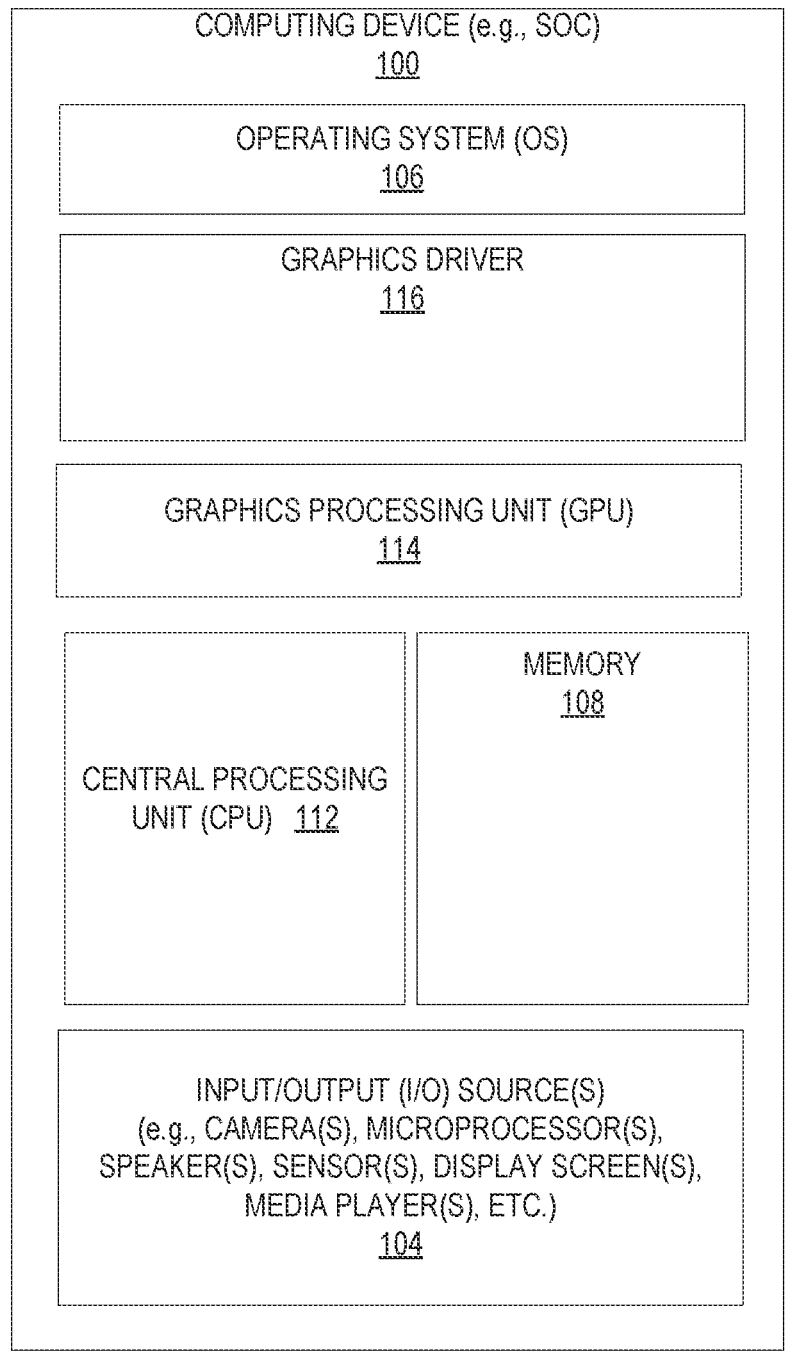
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2A:
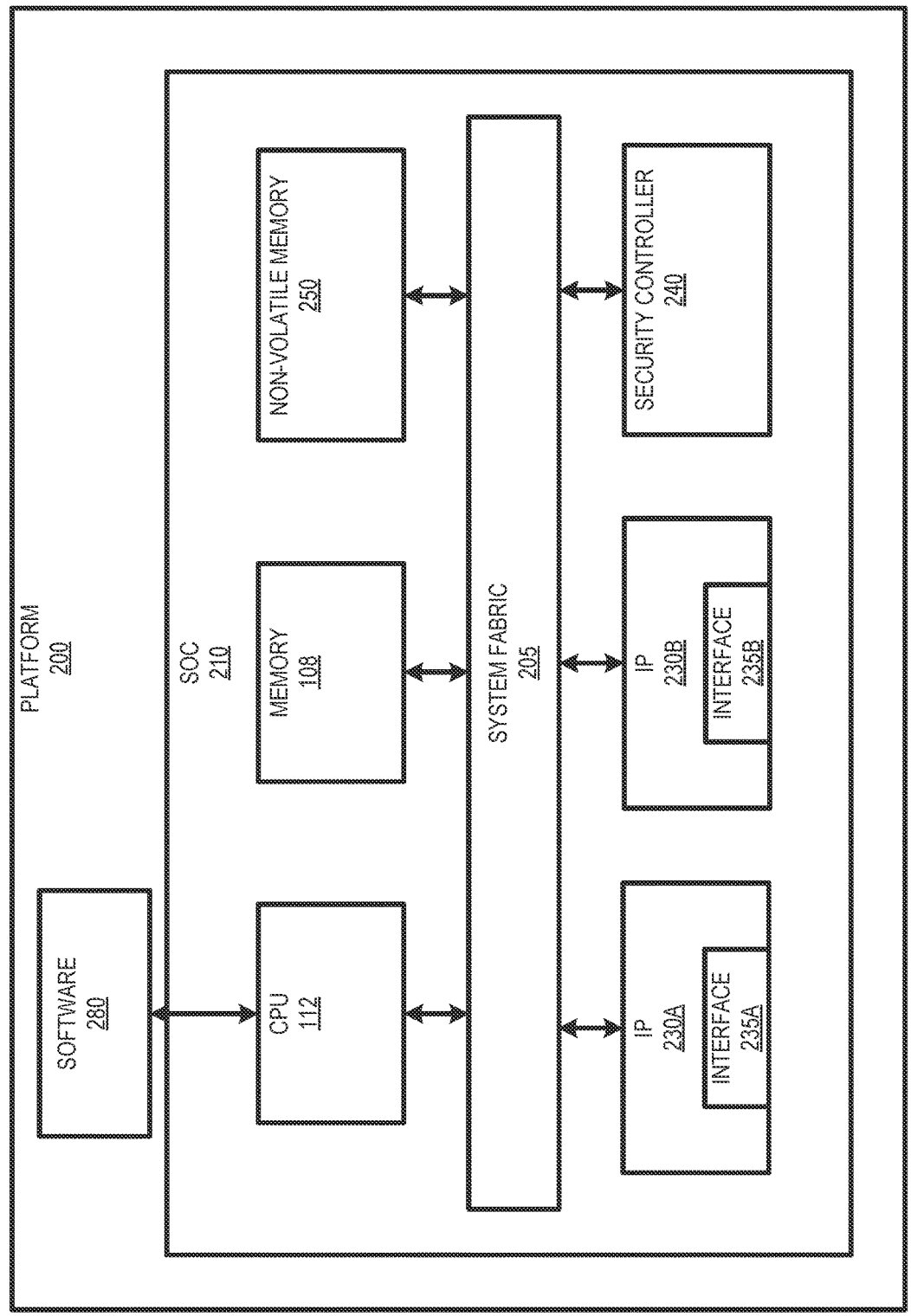
FIGS. 2A-2C illustrate embodiments of a platform.
Figure 2B:
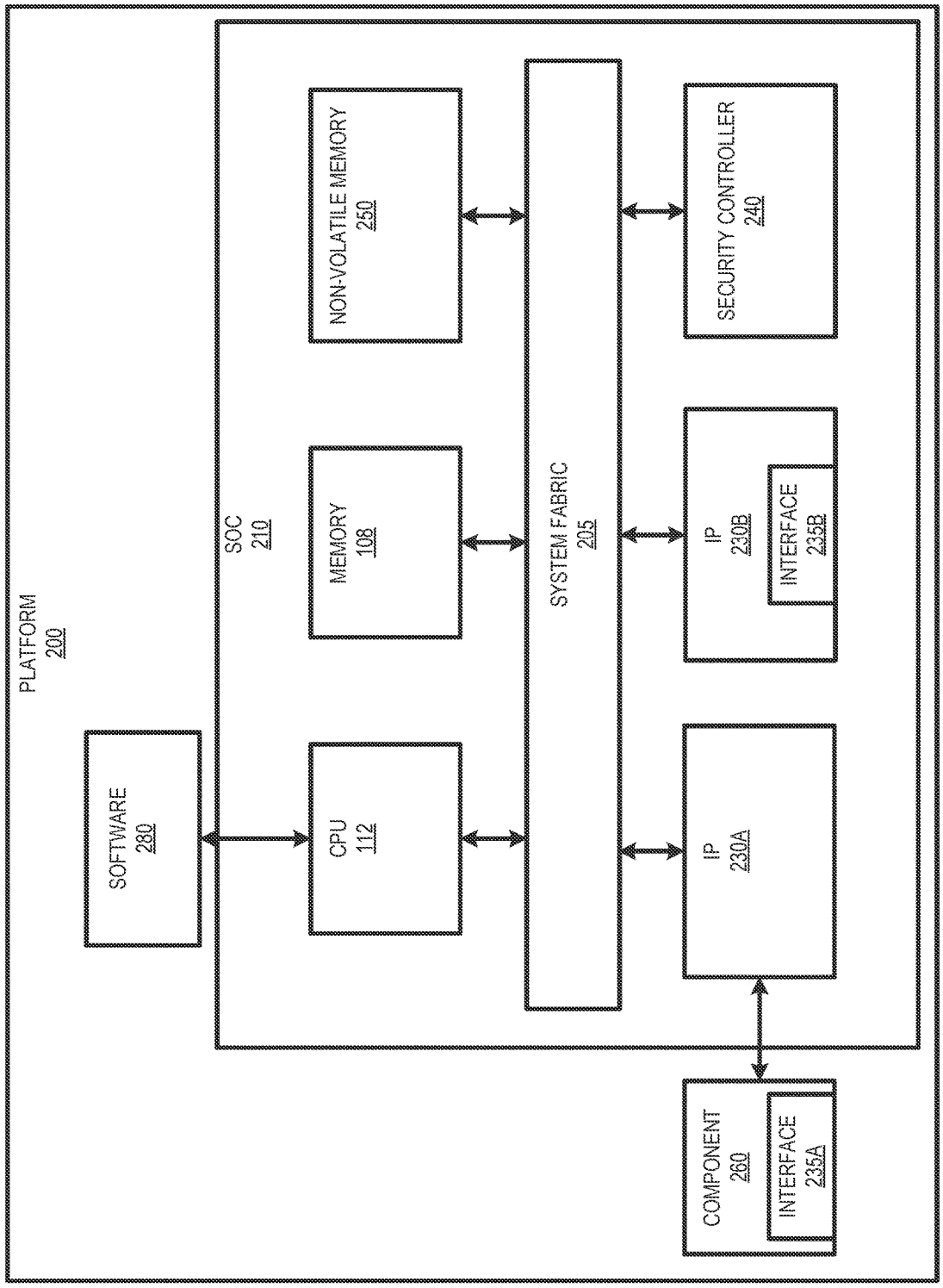
Figure 2C:
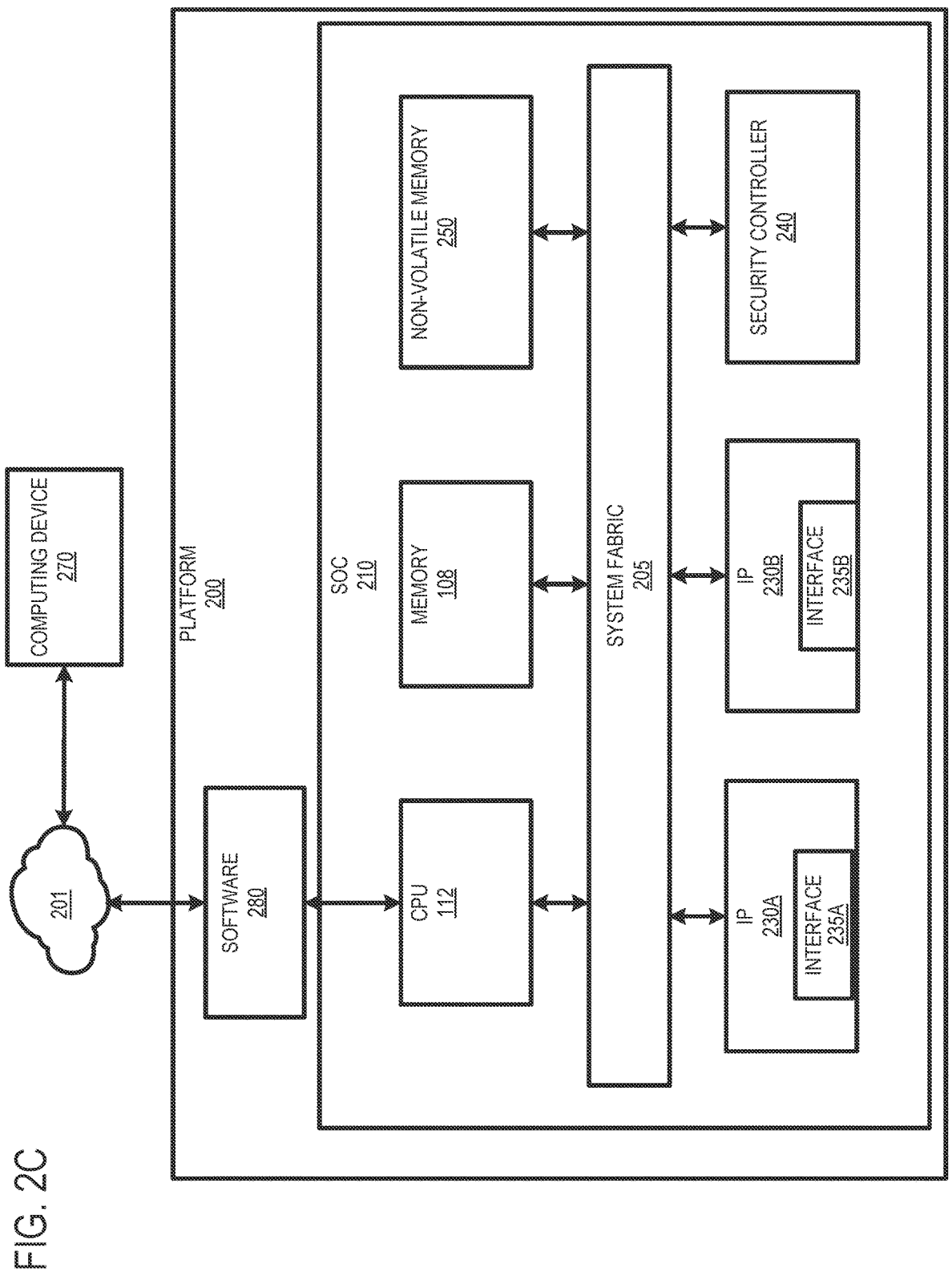

FIGS. 2A-2C illustrate embodiments of a platform 200 including a SOC 210 similar to computing device 100 discussed above. As shown in FIG. 2A, platform 200 includes SOC 210 communicatively coupled to one or more software components 280 via CPU 112. Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP agents 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises an IPA agent 230 that is implemented to perform the security operations. Further, SOC 210 includes a non-volatile memory 250. Non-volatile memory 250 may be implemented as a Peripheral Component Interconnect Express (PCIe) storage drive, such as a solid state drives (SSD) or Non-Volatile Memory Express (NVMe) drives. In one embodiment, non-volatile memory 250 is implemented to store the platform 200 firmware. For example, non-volatile memory 250 stores boot (e.g., Basic Input/Output System (BIOS)) and device (e.g., IP agent 230 and security controller 240) firmware.

FIG. 2B illustrates another embodiment of platform 200 including a component 260 coupled to SOC 210 via IP agent 230A. In one embodiment, IP agent 230A operates as a bridge, such as a PCIe root port, that connects component 260 to SOC 210. In this embodiment, component 260 may be implemented as a PCIe device (e.g., switch or endpoint) that includes a hardware interface 235 to enable component 260 to communicate with SOC 210 components. FIG. 2C illustrates yet another embodiment of platform 200 including a computing device 270 coupled to platform 200 via a cloud network 201. In this embodiment, computing device 270 comprises a cloud agent that is provided access to SOC 210 via software 280.

Currently, attacks by malicious agents on platform 200 firmware (e.g., non-volatile memory 250, IP agents 230, security controller 240, etc.) are on the rise. Such firmware attacks result in privacy data leaks, system downtime that negatively impact businesses. Additionally, these attacks have resulted in the National Institute of Standards and Technology releasing a Special Publication for Platform Firmware Resiliency titled the NIST SP800-193, which set firmware resiliency guidelines and requirements.

Typical implementations of firmware resiliency include a secondary firmware copy installed on a platform flash component. Moreover, the platform flash component includes a firmware descriptor that is not accessible by other entities on the platform. The descriptor holds the firmware start addresses and security permissions information. Hence allowing other firmware entities to access the descriptor region to perform recovery is not sufficiently secure.

According to one embodiment, a mechanism is disclosed to provide descriptor verification and recovery while the platform is coming out of reset. In such an embodiment, a backup copy of the descriptor is stored in the flash region and access to this region is restricted via a primary descriptor. In a further embodiment, an SPI controller is implemented to copy the backup descriptor into the primary descriptor copy.

Figure 3:
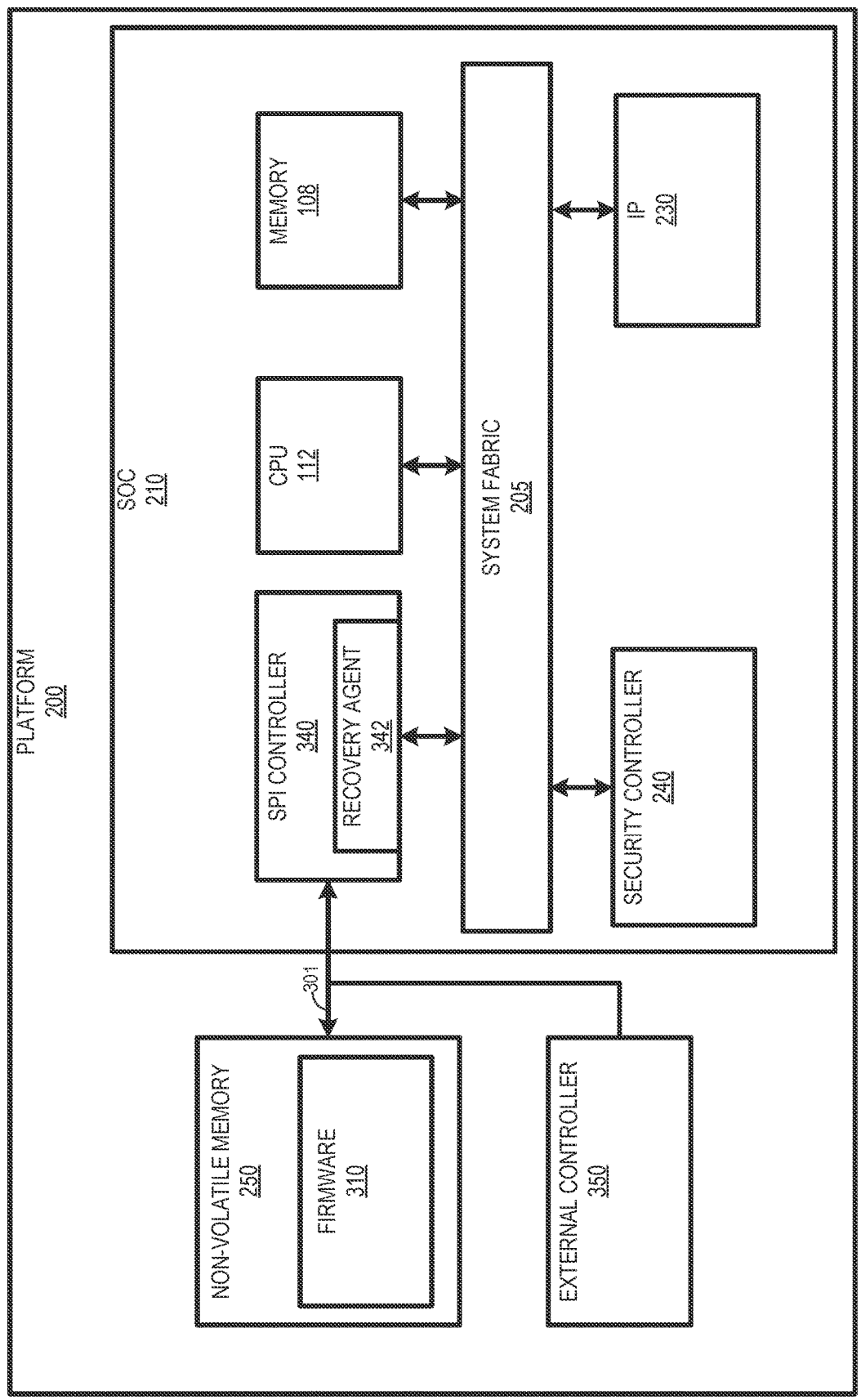
FIG. 3 illustrates yet another embodiment of a platform.

FIG. 3 illustrates yet another embodiment of platform 200 including non-volatile memory 250 coupled to SOC 210 via a serial peripheral interface (SPI) 301. As mentioned above, non-volatile memory 250 is implemented as a storage for platform firmware. In one embodiment, resiliency support is provided for firmware stored in non-volatile memory 250.

As defined herein, platform firmware resiliency describes security mechanisms for protecting platform against unauthorized changes, detecting unauthorized changes that occur and recovering from attacks. In a further embodiment, the firmware 310 is restored in order to bring back the system to a bootable state upon detection of corruption and/or failure.

Figure 4:
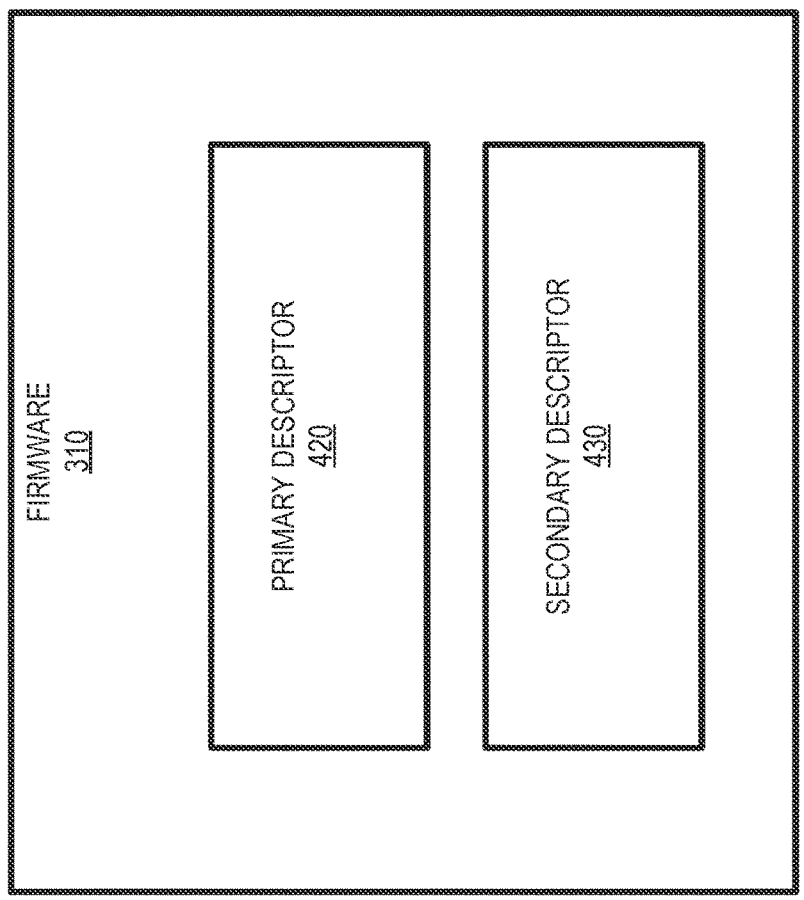
FIG. 4 illustrates one embodiment of firmware.

SPI controller 340 is also coupled to system fabric 205. In one embodiment, SPI controller 340 is a flash controller implemented to control access to non-volatile memory 250 via SPI 301. In such an embodiment, SPI controller 340 initializes, arbitrates and controls access to non-volatile memory 250 based on the contents of a descriptor included in firmware 310. FIG. 4 illustrates one embodiment of firmware 310. As shown in FIG. 4, firmware 310 includes primary descriptor 420 and secondary descriptor 430. As mentioned above, primary descriptor 420 provides access permission details for platform 200 components and address offset and size details to the firmware regions on non-volatile memory 250. Secondary (or backup) descriptor 430 includes the same content (e.g., backup copy of access permission details, address offset and size details, etc.,) as primary descriptor 420, and is used to recover the primary descriptor 420 upon a determination that the primary descriptor 420 is corrupt.

In other embodiments, one or more additional backup descriptor copy may be included within firmware 310. In such embodiments, a platform administrator (or Original Equipment Manufacturers (OEMs)) may override one of the backup descriptors via platform policies. In further embodiments, verification and recovery may continue to be performed by SPI controller 340. However the platform administrator/OEM has the option to provide a backup based on platform design. In still further embodiments, platform policies may be implemented to activate/deactivate the primary (or secondary) descriptor verification. Additionally, the platform policies may select between the secondary descriptor and one of the above-described additional backup descriptor copies.

According to one embodiment, SPI controller 340 protects the contents of primary descriptor 420. In such an embodiment, SPI controller 340 controls access to non-volatile memory 250 to ensure that platform 200 components (e.g., IP agent 230, security controller 240, etc.) have access only to their respective components of firmware 310. Referring back to FIG. 3, SPI controller 340 also manages firmware 310 accesses by external controllers, such as external controller 350.

In one embodiment, SPI controller 340 includes a recovery agent 342 to verify the contents of primary descriptor 420. In such an embodiment, recovery agent 342 verifies the contents of the primary descriptor by performing a cryptographic hash (e.g., SHA256) verification. In a further embodiment, recovery agent 342 includes storage to receive hash values of primary descriptor 420 and backup descriptor 430 to perform a runtime comparison against a calculated hash. In yet a further embodiment, recovery agent 342 detects a problem with primary descriptor 420 (e.g., attack, error or corruption issues) and recovers the contents of primary descriptor 420 using the contents of backup descriptor 430.

According to one embodiment, that recovery agent 342 reads primary descriptor 420 during a platform reset and calculates a primary descriptor hash value. The primary descriptor hash value is then compared to a stored primary hash value. Upon a determination that the primary descriptor hash value does not equal (e.g., does not match) the stored primary hash value, recovery agent 342 reads backup descriptor 430 and calculates a secondary descriptor hash value. The secondary descriptor hash value is then compared to a secondary primary hash value. Upon a determination that the backup descriptor hash equals the backup stored hash value, recovery agent 342 copies the contents of backup descriptor 430 and stores those contents to primary descriptor 420. Subsequently, the boot process continues. Upon a determination that the primary descriptor hash value does equal the stored primary hash value, backup descriptor 430 is verified, as discussed above, prior to continuing the boot process.

Figure 5:
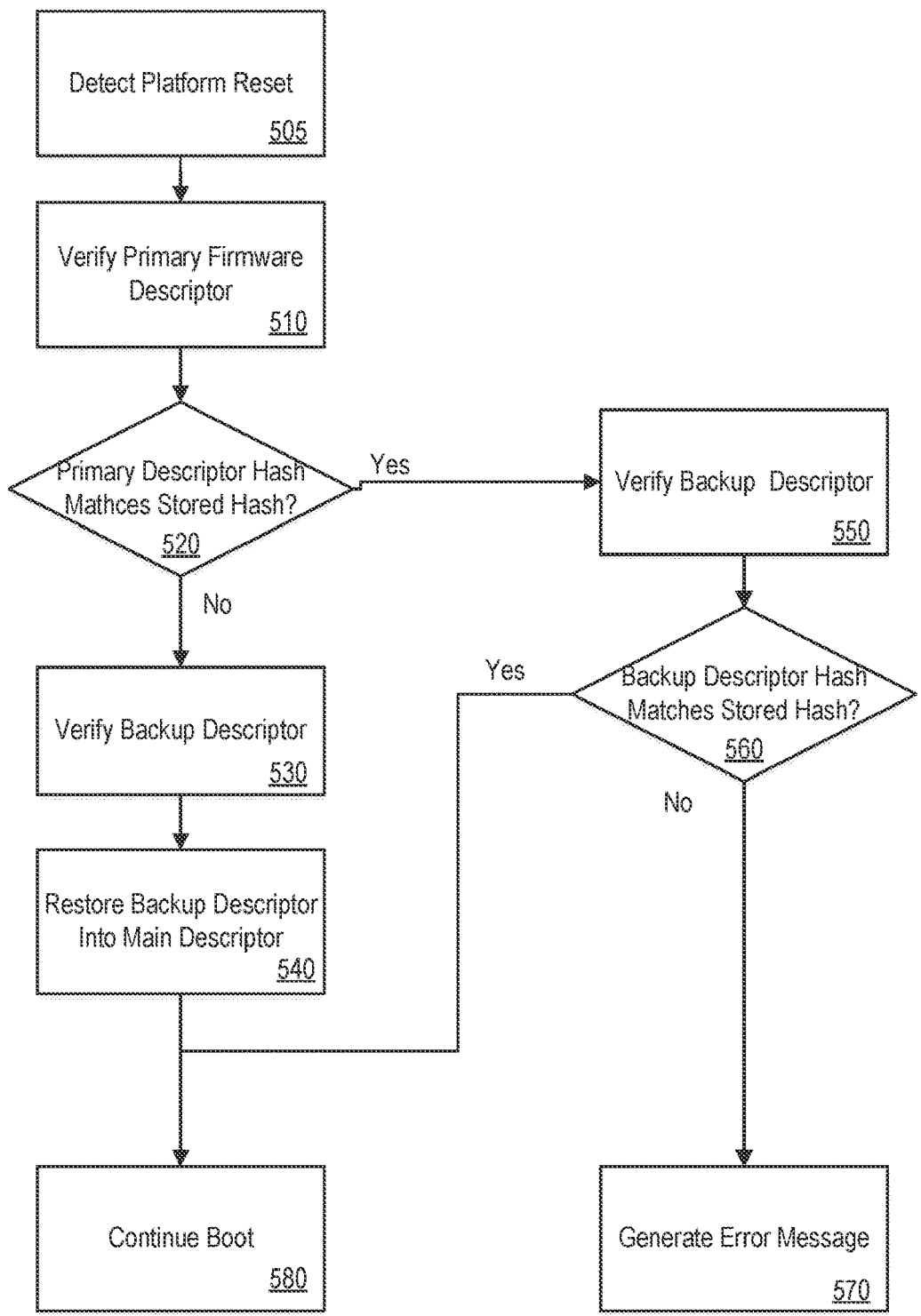
FIG. 5 is a flow diagram illustrating one embodiment of a descriptor resiliency process.

FIG. 5 is a flow diagram illustrating one embodiment of a descriptor resiliency process. At processing block 505, a platform reset is detected. At processing block 510, the primary firmware descriptor is verified. At decision block 520, a determination is made as to whether the primary descriptor hash value matches the stored primary hash value. If not, there is a problem with the primary firmware descriptor, and the backup descriptor is verified, processing block 530. Similar to the verification of the primary firmware descriptor, the backup descriptor is verified by comparing a secondary descriptor hash to the stored secondary hash value. Once verified, the primary descriptor is restored by copying the contents of the backup descriptor into the primary descriptor, processing block 540. At processing block 580, the boot process continues.

However, upon a determination at decision block 520 that the primary descriptor hash value matches the stored primary hash value, the primary descriptor is to be used. However, the backup descriptor is verified prior to proceeding with the boot process, processing block 550. At decision block 560, a determination is made as to whether the secondary descriptor hash value matches the stored secondary hash value. If so, control is returned to processing block 580, where the boot process continues. However, an error message is generated upon determining that the secondary descriptor hash value does not match the stored secondary hash value, processing block 570.

Figure 6:
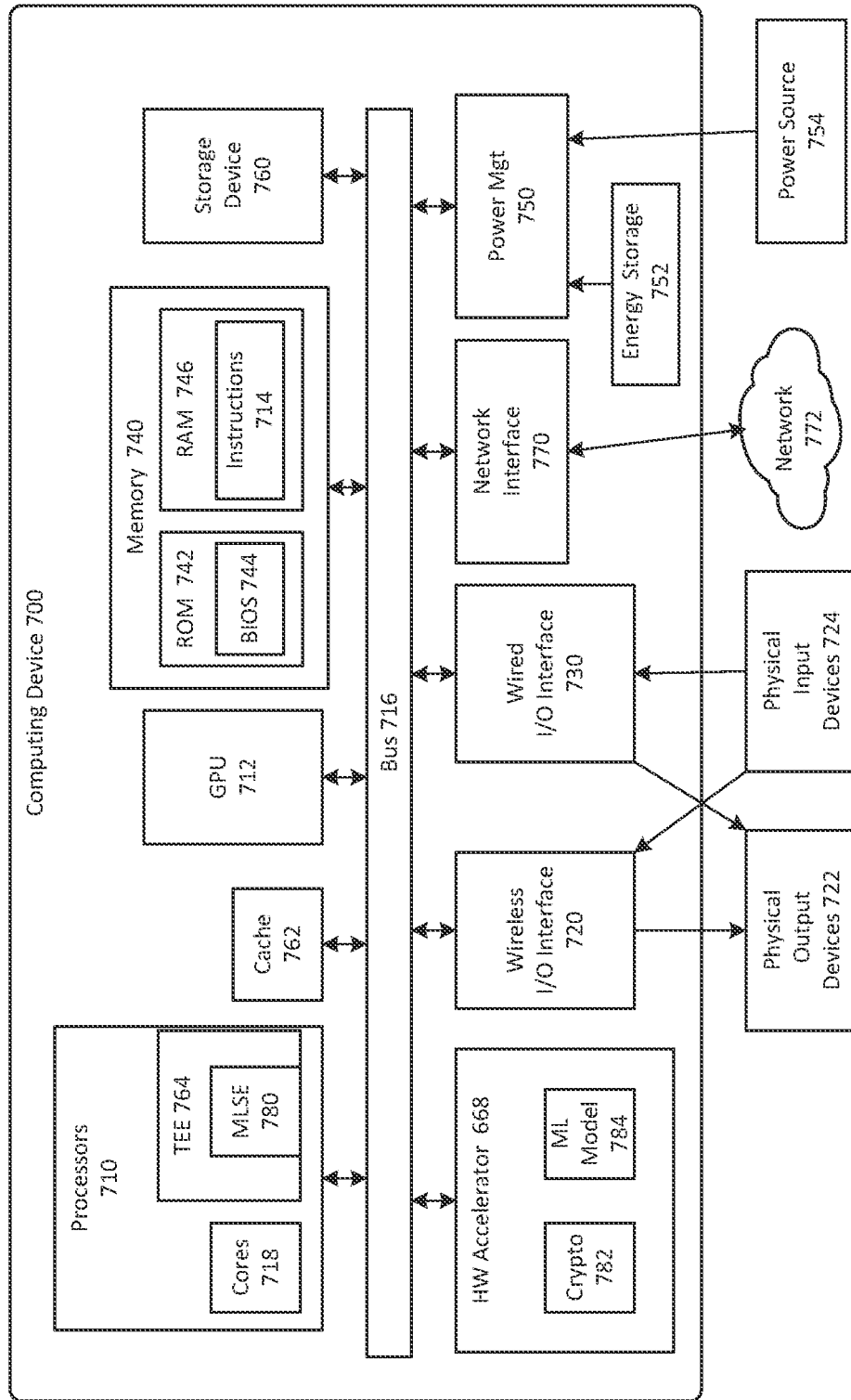
FIG. 6 illustrates one embodiment of a schematic diagram of an illustrative electronic computing device.

FIG. 6 is a schematic diagram of an illustrative electronic computing device to enable enhanced protection against adversarial attacks according to some embodiments. In some embodiments, the computing device 700 includes one or more processors 710 including one or more processors cores 718 and a TEE 764, the TEE including a machine learning service enclave (MLSE) 780. In some embodiments, the computing device 700 includes a hardware accelerator 768, the hardware accelerator including a cryptographic engine 782 and a machine learning model 784. In some embodiments, the computing device is to provide enhanced protections against ML adversarial attacks, as provided in FIGS. 1-5.

The computing device 700 may additionally include one or more of the following: cache 762, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to facilitate firmware descriptor resiliency in a computer system platform, comprising a non-volatile memory to store firmware for a computer system platform, wherein the firmware comprises a primary descriptor including access permission details for platform components and a secondary descriptor including a backup copy of the access permission details; and a controller, coupled to the first non-volatile memory, including recovery hardware to detect a problem during a platform reset with the primary descriptor, recover the contents of the primary descriptor from the backup copy included in the secondary descriptor and store the contents of the backup copy to primary descriptor.

Example 2 includes the subject matter of Example 1, wherein the non-volatile memory and the controller are coupled via a serial peripheral interface (SPI).

Example 3 includes the subject matter of Examples 1 and 2, wherein the recovery hardware verifies the primary descriptor during the platform reset.

Example 4 includes the subject matter of Examples 1-3, wherein verifying the primary descriptor comprises reading the primary descriptor, generating a primary descriptor hash value and comparing the primary descriptor hash value to a stored primary hash value.

Example 5 includes the subject matter of Examples 1-4, wherein the recovery hardware reads the secondary descriptor upon a determination that the primary descriptor hash value does not match the primary hash value.

Example 6 includes the subject matter of Examples 1-5, wherein the recovery hardware verifies the secondary descriptor.

Example 7 includes the subject matter of Examples 1-6, wherein verifying the secondary descriptor comprises generating a secondary descriptor hash value and comparing the secondary descriptor hash value to a stored secondary hash value.

Example 8 includes the subject matter of Examples 1-7, wherein the recovery hardware copies the content of the backup copy included in the secondary descriptor to the primary descriptor upon determining that the secondary descriptor hash value matches the stored secondary hash value.

Some embodiments pertain to Example 9 that includes a method to facilitate firmware descriptor resiliency in a computer system platform, comprising detecting a platform reset, verifying a primary descriptor during included in firmware stored in a non-volatile memory the platform rest to detect a problem with the primary descriptor, recovering contents of the primary descriptor from the backup copy included in the secondary descriptor and storing the contents of the backup copy to primary descriptor.

Example 10 includes the subject matter of Example 9, wherein verifying the primary descriptor comprises reading the primary descriptor, generating a primary descriptor hash value and comparing the primary descriptor hash value to a stored primary hash value.

Example 11 includes the subject matter of Examples 9 and 10, further comprising reading the secondary descriptor upon a determination that the primary descriptor hash value does not match the primary hash value.

Example 12 includes the subject matter of Examples 9-11, further comprising verifying the secondary descriptor.

Example 13 includes the subject matter of Examples 9-12, wherein verifying the secondary descriptor comprises generating a secondary descriptor hash value and comparing the secondary descriptor hash value to a stored secondary hash value.

Example 14 includes the subject matter of Examples 9-13, further comprising copying the content of the backup copy included in the secondary descriptor to the primary descriptor upon determining that the secondary descriptor hash value matches the stored secondary hash value.

Some embodiments pertain to Example 15 that includes a t least one computer readable medium having instructions stored thereon, which when executed by one or more processors, cause the processors to detect a platform reset, verify a primary descriptor during included in firmware stored in a non-volatile memory the platform rest to detect a problem with the primary descriptor and recover contents of the primary descriptor from the backup copy included in the secondary descriptor and storing the contents of the backup copy to primary descriptor.

Example 16 includes the subject matter of Example 15, wherein verifying the primary descriptor comprises reading the primary descriptor, generating a primary descriptor hash value and comparing the primary descriptor hash value to a stored primary hash value.

Example 17 includes the subject matter of Examples 15 and 16, having instructions stored thereon, which when executed by one or more processors, further cause the processors to read the secondary descriptor upon a determination that the primary descriptor hash value does not match the primary hash value.

Example 18 includes the subject matter of Examples 15-17, having instructions stored thereon, which when executed by one or more processors, further cause the processors to verify the secondary descriptor.

Example 19 includes the subject matter of Examples 15-18, wherein verifying the secondary descriptor comprises generating a secondary descriptor hash value and comparing the secondary descriptor hash value to a stored secondary hash value.

Example 20 includes the subject matter of Examples 15-19, having instructions stored thereon, which when executed by one or more processors, further cause the processors to copy the content of the backup copy included in the secondary descriptor to the primary descriptor upon determining that the secondary descriptor hash value matches the stored secondary hash value.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An apparatus to facilitate firmware descriptor resiliency in a computer system platform, comprising:
   a non-volatile memory to store firmware for the computer system platform, wherein the firmware comprises:
      a primary descriptor including access permission details for platform components; and
      a secondary descriptor including a backup copy of the access permission details; and
   a controller, coupled to the non-volatile memory, including recovery hardware to verify the primary descriptor during a platform reset, including determining whether a primary descriptor hash value matches a stored primary hash value, recover contents of the primary descriptor from the backup copy included in the secondary descriptor upon determining that the primary descriptor hash value does not match the stored primary hash value, verify the secondary descriptor and store the contents of the backup copy to primary descriptor.

2. The apparatus of claim 1, wherein the non-volatile memory and the controller are coupled via a serial peripheral interface (SPI).

3. The apparatus of claim 1, wherein verifying the primary descriptor further comprises reading the primary descriptor, generating the primary descriptor hash value and comparing the primary descriptor hash value to the stored primary hash value.

4. The apparatus of claim 1, wherein the recovery hardware verifies the secondary descriptor.

5. The apparatus of claim 4, wherein verifying the secondary descriptor comprises generating a secondary descriptor hash value and comparing the secondary descriptor hash value to a stored secondary hash value.

6. The apparatus of claim 5, wherein the recovery hardware copies the content of the backup copy included in the secondary descriptor to the primary descriptor upon determining that the secondary descriptor hash value matches the stores secondary hash value.

7. A method to facilitate firmware descriptor resiliency in a computer system platform, comprising:
   detecting a platform reset;
   verifying a primary descriptor included in firmware stored in a non-volatile memory during the reset, including determining whether a primary descriptor hash value matches a stored primary hash value;
   recovering contents of the primary descriptor from a backup copy in a secondary descriptor included in the firmware upon determining that the primary descriptor hash value does not match the stored primary hash value;
   verifying the secondary descriptor and storing the contents of the backup copy to primary descriptor.

8. The method of claim 7, wherein verifying the primary descriptor further comprises:
   reading the primary descriptor;
   generating a primary descriptor hash value; and
   comparing the primary descriptor hash value to a stored primary hash value.

9. The method of claim 8, further comprising reading the secondary descriptor upon a determination that the primary descriptor hash value does not match the primary hash value.

10. The method of claim 7, wherein verifying the secondary descriptor comprises:
    generating a secondary descriptor hash value; and
    comparing the secondary descriptor hash value to a stored secondary hash value.

11. The method of claim 10, further comprising copying the content of the backup copy included in the secondary descriptor to the primary descriptor upon determining that the secondary descriptor hash value matches the stored secondary hash value.

12. At least one non-transitory computer readable medium having instructions stored thereon, which when executed by one or more processors, cause the processors to:
    detect a platform reset;
    verify a primary descriptor included in firmware stored in a non-volatile memory during the reset, including determining whether a primary descriptor hash value matches a stored primary hash value;
    recover contents of the primary descriptor from a backup copy in a secondary descriptor included in the firmware upon determining that the primary descriptor hash value does not match the stored primary hash value;
    verify the secondary descriptor and store the contents of the backup copy to primary descriptor.

13. The non-transitory computer readable medium of claim 12, wherein verifying the primary descriptor comprises:
    reading the primary descriptor;
    generating a primary descriptor hash value; and
    comparing the primary descriptor hash value to a stored primary hash value.

14. The non-transitory computer readable medium of claim 13, having instructions stored thereon, which when executed by one or more processors, further cause the processors to read the secondary descriptor upon a determination that the primary descriptor hash value does not match the primary hash value.

15. The non-transitory computer readable medium of claim 12, wherein verifying the secondary descriptor comprises:
    generating a secondary descriptor hash value; and
    comparing the secondary descriptor hash value to a stored secondary hash value.

16. The non-transitory computer readable medium of claim 15, having instructions stored thereon, which when executed by one or more processors, further cause the processors to copy the content of the backup copy included in the secondary descriptor to the primary descriptor upon determining that the secondary descriptor hash value matches the stored secondary hash value.

* * * * *